(12) United States Patent
Vajravel et al.

(10) Patent No.: US 10,235,189 B2
(45) Date of Patent: Mar. 19, 2019

(54) ISOLATING A REDIRECTED SMART CARD READER TO A REMOTE SESSION

(71) Applicant: Wyse Technology L.L.C., Santa Clara, CA (US)

(72) Inventors: Gokul Thiruchengode Vajravel, Bangalore (IN); Ramanujam Kaniyar Venkatesh, Bangalore (IN)

(73) Assignee: Wyse Technology L.L.C., Santa Clara, CA (US)

( * ) Notice: Subject to any disclaimer, the term of this patent is extended or adjusted under 35 U.S.C. 154(b) by 259 days.

(21) Appl. No.: 15/341,182

(22) Filed: Nov. 2, 2016

(65) Prior Publication Data

US 2018/0121224 A1   May 3, 2018

(51) Int. Cl.
*G06F 9/455* (2018.01)
*G06F 9/448* (2018.01)
*H04L 29/08* (2006.01)

(52) U.S. Cl.
CPC ............ *G06F 9/4484* (2018.02); *H04L 67/08* (2013.01); *H04L 67/146* (2013.01); *H04L 67/2814* (2013.01)

(58) Field of Classification Search
None
See application file for complete search history.

(56) References Cited

U.S. PATENT DOCUMENTS

| | | | | |
|---|---|---|---|---|
| 7,069,439 B1* | 6/2006 | Chen | ...................... | G06F 21/34 380/251 |
| 7,418,717 B1* | 8/2008 | Dolske | ................ | H04L 63/0853 235/379 |
| 10,050,957 B1* | 8/2018 | Farrugia | ............. | H04L 63/0853 |
| 2009/0064301 A1* | 3/2009 | Sachdeva | ................ | G06F 9/468 726/9 |
| 2010/0100893 A1* | 4/2010 | Klissner | ................ | G06F 13/387 719/328 |
| 2013/0139185 A1* | 5/2013 | Klissner | ............. | G06F 11/3636 719/328 |
| 2018/0063185 A1* | 3/2018 | Fan | ........................ | H04L 63/102 |
| 2018/0115613 A1* | 4/2018 | Vajravel | ................ | H04L 67/141 |

* cited by examiner

*Primary Examiner* — Kenneth Tang
(74) *Attorney, Agent, or Firm* — Kirton McConkie; Brian Tucker

(57) ABSTRACT

A smart card stub and a smart card proxy can be employed to enable a redirected smart card reader to be accessed within a remote session. To isolate a redirected smart card to a remote session, the smart card stub can be configured to process a response to an application's request to enumerate smart card readers. This processing can include obtaining a session identifier for each enumerated smart card reader and removing any smart card reader from the response if the session identifier of the smart card reader does not match the session identifier of the requesting application. The smart card stub can communicate with a filter driver to obtain the session identifiers employed in this process.

20 Claims, 18 Drawing Sheets

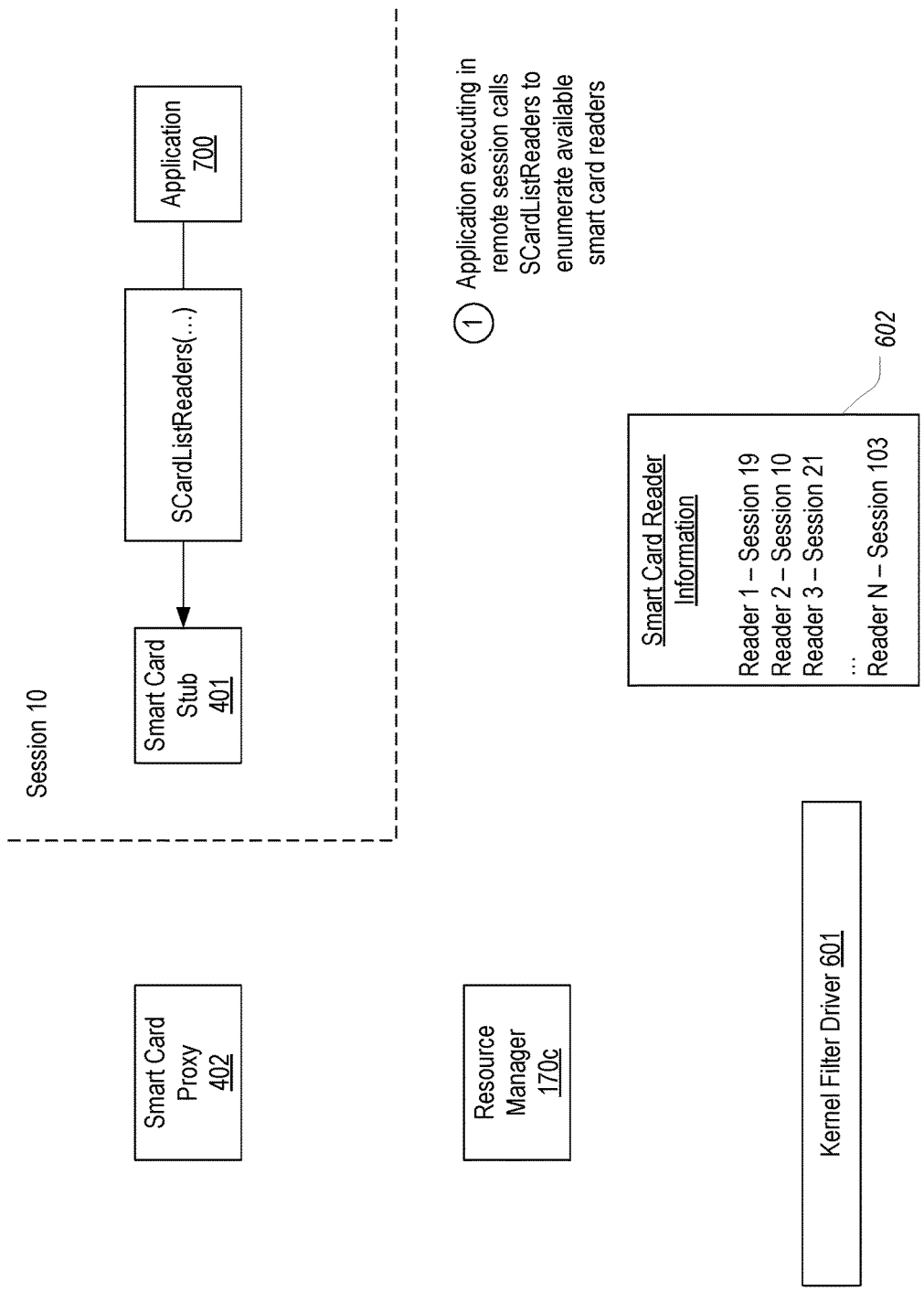

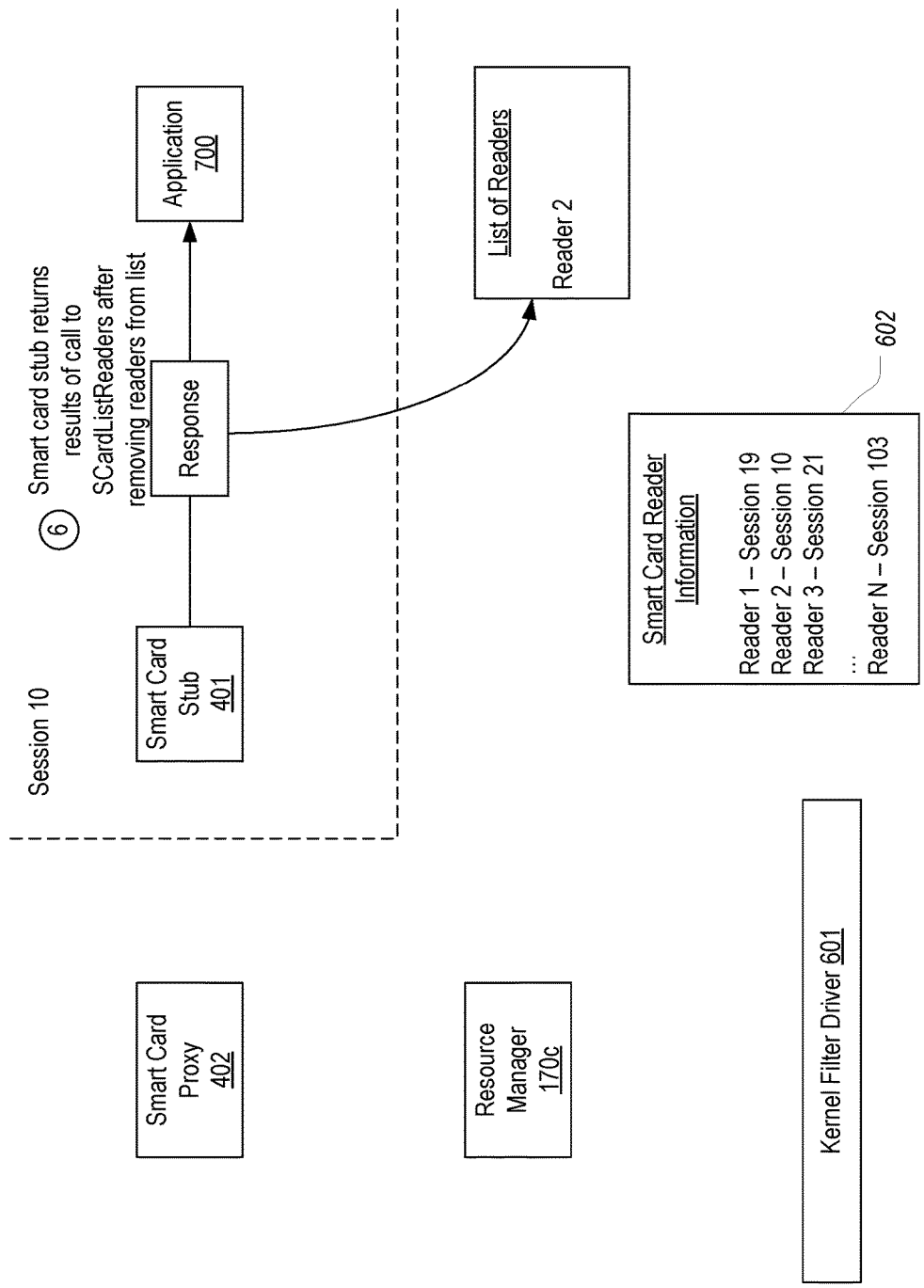

ISOLATING A REDIRECTED SMART CARD READER TO A REMOTE SESSION

CROSS-REFERENCE TO RELATED APPLICATIONS

N/A

BACKGROUND

The present invention is generally directed to USB device redirection in a virtual desktop infrastructure (VDI) environment. USB device redirection generally refers to making a USB device that is connected to a client accessible within a virtual desktop as if the USB device had been physically connected to the virtual desktop. In other words, when USB device redirection is implemented, a user can connect a USB device to his or her client terminal and the USB device will function as if it had been connected to the server.

FIGS. 1 and 2 and the following description will provide a general overview of how USB device redirection can be implemented in accordance with some embodiments of the present invention. In FIG. 1, a computing system 100 is depicted as including a number of client terminals 102a-102n (referenced generally herein as client(s) 102) in communication with a server 104 via a network 106. Server 104 can be configured to support a remote session (e.g., a remote desktop session) wherein a user at a client 102 can remotely access applications and data at the server 104 from the client 102. Such a connection may be established using any of several well-known techniques such as the Remote Desktop Protocol (RDP) and the Citrix® Independent Computing Architecture (ICA).

Client terminal 102 may represent a computer, a mobile phone (e.g., smart phone), a laptop computer, a thin client terminal, a personal digital assistant (PDA), a portable computing terminal, or a suitable terminal or device with a processor. Server 104 may represent a computer, a laptop computer, a computing terminal, a virtual machine (e.g., VMware® Virtual Machine), a desktop session (e.g., Microsoft Terminal Server), a published application (e.g., Microsoft Terminal Server) or a suitable terminal with a processor.

Client 102 may initiate a remote session with server 104 by sending a request for remote access and credentials (e.g., login name and password) to server 104. If server 104 accepts the credentials from client 102, then server 104 may establish a remote session, which allows a user at client 102 to access applications and data at server 104. During the remote session, server 104 sends display data to client 102 over network 106, which may include display data of a desktop and/or one or more applications running on server 104. The desktop may include, for example, icons corresponding to different applications that can be launched on server 104. The display data allows client 102 to locally display the desktop and/or applications running on server 104.

During the remote session, client 102 may send user commands (e.g., inputted via a mouse or keyboard at client 102) to server 104 over network 106. Server 104 may process the user commands from client 102 similar to user commands received from an input device that is local to server 104. For example, if the user commands include mouse movements, then server 104 may move a pointer on the desktop running on server 104 accordingly. When the display data of the desktop and/or application changes in response to the user commands, server 104 sends the updated display data to client 102. Client 102 locally displays the updated display data so that the user at client 102 can view changes at server 104 in response to the user commands. Together, these aspects allow the user at client 102 to locally view and input commands to the desktop and/or application that is running remotely on server 104. From the perspective of the client side, the desktop running on server 104 may represent a virtual desktop environment.

FIG. 2 is a block diagram of a local device virtualization system 200 in accordance with embodiments of the present invention. System 200 may include client 102 in communication with server 104 over network 106 as illustrated in FIG. 1. Client 102 may include a proxy 210, a stub driver 220, and a bus driver 230. Client 102 can be connected to a device 240, as shown in FIG. 2. Server 104 may include an agent 250 and a virtual bus driver 260.

In accordance with USB device redirection techniques, while device 240 is not locally or physically connected to server 104 and is remote to server 104, device 240 appears to server 104 as if it is locally connected to server 104, as discussed further below. Thus, device 240 appears to server 104 as a virtual device 290.

By way of illustration and not limitation, device 240 may be any type of USB device including a machine-readable storage medium (e.g., flash storage device), a printer, a scanner, a camera, a facsimile machine, a phone, an audio device (e.g., a headset), a video device (e.g., a camera), a peripheral device, or other suitable device that can be connected to client 102. Device 240 may be an external device (i.e., external to client 102) or an internal device (i.e., internal to client 102).

Bus driver 230 can be configured to allow the operating system and programs of client 102 to interact with device 240. In one aspect, when device 240 is connected to client 102 (e.g., plugged into a port of client 102), bus driver 230 may detect the presence of device 240 and read information regarding device 240 ("device information") from device 240. The device information may include features, characteristics and other information specific to device 240 such as a device descriptor (e.g., product ID, vendor ID and/or other information), a configuration descriptor, an interface descriptor, an endpoint descriptor and/or a string descriptor. Bus driver 230 may communicate with device 240 through a computer bus or other wired or wireless communications interface.

In accordance with USB device redirection techniques, device 240 may be accessed from server 104 as if the device were connected locally to server 240. Device 240 may be accessed from server 104 when client 102 is connected to server 104 through a remote session running on server 104. For example, device 240 may be accessible from the desktop running on server 104 (i.e., virtual desktop environment). To enable this, bus driver 230 may be configured to load stub driver 220 as the default driver for device 240. Stub driver 220 may be configured to report the presence of device 240 to proxy 210 and to provide the device information (e.g., device descriptor) to proxy 210. Proxy 210 may be configured to report the presence of device 240, along with the device information, to agent 250 of server 104 over network 106. Thus, stub driver 220 redirects device 240 to server 104 via proxy 210.

Agent 250 may be configured to receive the report from proxy 210 that device 240 is connected to client 102 and the device information. Agent 250 may further be configured to associate with the report from proxy 210 one or more identifiers for client 102 and/or for a remote session through which client 102 is connected to server 104, such as a session number or a session locally unique identifier (LUID). Agent 250 can provide notification of device 240, along with the device information, to virtual bus driver 260. Virtual bus driver 260 (which may be a TCX USB bus driver, or any other bus driver) may be configured to create and store in memory a record corresponding to device 240, the record including at least part of the device information and session identifiers received from agent 250. Virtual bus driver 260 may be configured to report to operating system 170 of server 104 that device 240 is connected and to provide the device information to the operating system. This allows the operating system of server 104 to recognize the presence of device 240 even though device 240 is connected to client 102.

The operating system of server 104 may use the device information to find and load one or more appropriate device drivers for device 240 at server 104. Each driver may have an associated device object (object(s) 281a, 281b, . . . , 281n, referred to generally as device object(s) 281), as illustratively shown in FIG. 2. A device object 281 is a software implementation of a real device 240 or a virtualized (or conceptual) device 290. Different device objects 281 layer over each other to provide the complete functionality. The different device objects 281 are associated with different device drivers (driver(s) 282a, 282b, . . . 282n, referred to generally as device driver(s) 282). In an example, a device 240 such as a USB flash drive may have associated device objects including objects corresponding to a USB driver, a storage driver, a volume manager driver, and a file system driver for the device. The device objects 281 corresponding to a same device 240 form a layered device stack 280 for device 240. For example, for a USB device, a USB bus driver will create a device object 281a stating that a new device has been plugged in. Next, a plug-and-play (PNP) component of the operating system will search for and load the best driver for device 240, which will create another device object 281b that is layered over the previous device object 281a. The layering of device objects 281 will create device stack 280.

Device objects 281 may be stored in a memory of the server 104 associated with virtual bus driver 260. In particular, device objects 281 and resulting device stack 280 may be stored in random-access memory of server 104. Different devices 240/290 can have device stacks having different device objects and different numbers of device objects. The device stack may be ordered, such that lower level device objects (corresponding to lower level device drivers) have lower numbers than higher level device objects (corresponding to higher level device drivers). The device stack may be traversed downwards by traversing the stack from higher level objects to lower level objects. For example, in the case of an illustrative device stack 280 corresponding to a USB flash drive, the ordered device stack may be traversed downwards from a high-level file system driver device object, to a volume manager driver device object, to a storage driver device object, to a USB driver device object, and finally to a low-level virtual bus driver device object. Different device stacks 280 can be layered over each other to provide the functionality of the devices 240/290 inside devices, like USB Headsets, or USB pen drives. A USB pen drive, for example, can create a USB device stack first, over which it can create a storage device stack, where each of the device stacks have two or more device objects.

Once one or more device object(s) 281 are loaded by operating system 170 of server 104, each device object 281 can create a symbolic link (also referred to as a "device interface") to device object 281 and associated device driver 282. The symbolic link is used by applications running on server 104 to access device object 281 and device 240/290. The symbolic link can be created by a call to a function such as IoCreateSymbolicLink( ) including such arguments as a name for the symbolic link, and a name of device object 281 or associated device 240. In one example, for example, a symbolic link to a USB flash drive device 240 is created by a call from a device object 281 for device 240 to the function IoCreateSymbolicLink( ) including arguments "\\GLOBAL??\C:" (i.e., the name for the symbolic link) and "\Device\HarddiskVolume1" (i.e., a name of the device object).

The creation of a symbolic link results in an entry being created in an object manager namespace (OMN) of operating system 170. The OMN stores information on symbolic links created for and used by operating system 170, including symbolic links for devices 240, virtualized devices 290, and applications 270 running on server 104.

As a result of the symbolic link creation process, a symbolic link to device 240 is enumerated in the OMN of server 104. Once the presence of device 240 is reported to operating system 170 of server 104, device 240 may be accessible from a remote session (and associated desktop) running on server 104 (i.e., virtual desktop environment). For example, device 240 may appear as an icon on the virtual desktop environment and/or may be accessed by applications running on server 104.

An application 270 running on server 104 may access device 240 by sending a transaction request including the symbolic link for device 240 to operating system 170. Operating system 170 may consult the Object Manager Namespace to retrieve an address or other identifier for the device itself 240 or for a device object 281 associated with device 240. Using the retrieved address or identifier, operating system 170 forwards the transaction request for device 240 either directly, through a device object 281 of device stack 280, and/or through virtual bus driver 260. Virtual bus driver 260 may direct the transaction request to agent 250, which sends the transaction request to proxy 210 over network 106. Proxy 210 receives the transaction request from agent 250, and directs the received transaction request to stub driver 220. Stub driver 220 then directs the transaction request to device 240 through bus driver 230.

Bus driver 230 receives the result of the transaction request from device 240 and sends the result of the transaction request to stub driver 220. Stub driver 220 directs the result of the transaction request to proxy 210, which sends the result of the transaction request to agent 250 over network 106. Agent 250 directs the result of the transaction request to virtual bus driver 260. Virtual bus driver 260 then directs the result of the transaction request to application 270 either directly or through a device object 281 of device stack 280.

Thus, virtual bus driver 260 may receive transaction requests for device 240 from application 270 and send results of the transaction requests back to application 270 (either directly or through a device object 281 of device stack 280). As such, application 270 may interact with virtual bus driver 260 in the same way as with a bus driver for a device that is connected locally to server 104. Virtual bus driver 260 may hide the fact that it sends transaction requests to agent 250 and receives the results of the transaction requests from agent 250 instead of a device that is connected locally to server 104. As a result, device 240 connected to client 102 may appear to application 270 as if the physical device 240 is connected locally to server 104.

Smart card readers are a type of USB device that can be redirected in much the same manner as described above. However, due to security concerns, the Windows operating system places limits on how an application can access a smart card that has been inserted into a smart card reader. In particular, the Windows operating system does not allow an application executing within a remote session to access a smart card unless the smart card reader is mapped from the remote session. Using the above described redirection techniques, a redirected smart card reader will appear as if it was locally connected, and therefore it will not be accessible within the remote session.

FIG. 3A provides an example of how Windows applies these limits using the same general architecture of server 104 as described above. In this example, a smart card reader 340 is connected directly to server 104 (i.e., not over a remote session). For ease of illustration, smart card reader 340 can generally represent a smart card reader alone or a smart card reader and a smart card that has been inserted into the reader.

As is typical, operating system 170 will cause appropriate drivers to be loaded for smart card reader 340 as represented by smart card driver stack 380. An application 370 can therefore access smart card reader 340 via the appropriate interfaces of operating system 170. In the Windows operating system, an application can access a smart card via a cryptographic service provider (or CSP) and the WinSCard API. This CSP may be a vendor-specific CSP or a Windows-provided CSP (Basecsp.dll) which works in tandem with a vendor-provided smart card mini-driver. CSP 170a is intended to represent either of these scenarios.

Via CSP 170a and WinSCard API 170b, application 370 can invoke functionality of the Smart Card Resource Manager service (or simply "resource manager") 170c. Resource manager 170c then interfaces with the smart card driver(s) for any smart card reader connected to server 104 whether physically or virtually.

Resource manager 170c is the component of the Windows operating system that is configured to block access to a smart card reader from any application that is running in a remote session thus making a redirected smart card reader inaccessible within a remote session. The exact manner in which resource manager 170c blocks access is beyond the scope of this discussion. Suffice it to say that the Windows smart card subsystem will only list mapped smart card readers to applications executing within a remote session such that the smart card readers, including redirected smart card readers, will not be visible to such applications. For example, FIG. 3B illustrates a scenario where smart card reader 340 is connected to client 102 and redirected to server 104 via a remote session such that virtual smart card reader 390 appears on server 104. To resource manager 170c, smart card reader 390 will appear as a locally connected device.

In this scenario, the user may run application 370 for the purpose of accessing smart card reader 340. However, because application 370 is executing within a remote session, resource manager 170c will block access to smart card reader 340 (since it believes smart card reader 370 is locally connected). In short, Windows is configured to prevent a smart card reader from being accessed within a remote session whether or not the smart card reader is locally connected or redirected over a remote session.

To enable a smart card reader to be accessed within a remote session, driver mapping techniques have been created. FIG. 3C generally illustrates how this driver mapping can be implemented. To enable smart card access within a remote session, a driver mapping component 385 can be executed on server 104 and smart card driver stack 380 can be installed on client 102. Driver mapping component 385 can generally represent any of the possible ways in which a driver can be mapped as is known in the art. For simplicity, it can be assumed that driver mapping component 385 intercepts smart card API calls that are directed towards smart card driver stack 380 installed on server 104 and routes these API calls to proxy 210 (or another component) via RPC. In essence, this bypasses the mechanisms in the Windows Smart Card Subsystem (i.e., resource manager 170c) that would otherwise block the API calls due to application 370 being executed within a remote session. Proxy 210 can then invoke these API calls. Responses from smart card reader 340 can be returned in a similar manner.

Although this driver mapping technique works, it is not desirable or possible in many situations. For example, client 102 may not be compatible with the smart card driver(s) that will need to be loaded into smart card driver stack 380 in order to handle some or all of the mapped API calls. Specifically, a Linux operating system is employed on many thin clients and Windows-based smart card drivers are incompatible with Linux. Additionally, very few smart card providers have developed drivers that can be employed for driver mapping on non-Windows clients.

Further, to accommodate mismatches between the versions of the client operating system and the server operating system, current driver mapping solutions do not map all smart card APIs. For example, many smart card APIs that are available in Windows Server 2016 or Windows 10 (e.g., the SCardGetReaderDeviceInstanceId function) are not mapped and will therefore fail if invoked inside a remote session.

Finally, installing the smart card drivers on the client prevents the client from being "lightweight." For example, many entities create computing environments in which their employees use thin or zero clients. It is oftentimes desirable to minimize the components on these clients to reduce cost. Requiring the installation of the smart card drivers in turn increases the hardware requirements for the client as well as requires additional management.

BRIEF SUMMARY

The present invention extends to methods, systems, and computer program products for isolating a redirected smart card reader to a remote session. This session level isolation can be implemented using a kernel filter driver that is layered on top of the redirected smart card device driver stack.

To enable access to the redirected smart card reader within the remote session, a smart card stub can be executed within the remote session and can function to intercept an application's API calls to access the smart card reader including calls to enumerate smart card readers that are connected to the server. A corresponding smart card proxy can also be executed within session 0 and can function to receive the intercepted API calls from the smart card stub. The smart card proxy can then execute the API calls. Because the smart card proxy is executing in session 0, the smart card resource manager service will not block access. When the smart card proxy receives a response, it can pass the response back to the smart card stub which in turn will return it to the calling application.

When an application executing in a remote session attempts to enumerate smart card readers that are connected, whether physically or virtually, to the server (e.g., by calling the SCardListReadersA or SCardListReadersW function), the smart card stub and smart card proxy will interact as described above to prevent the smart card resource manager service from blocking the request. As a result, a list of smart card readers will be returned. When the smart card stub receives this list, it can interface with the kernel filter driver to determine which smart card readers in the list pertain to the same session as the application. If it is determined that a smart card reader in the list does not pertain to the same session as the application, the smart card stub can remove the smart card reader from the list. After this process, the smart card stub can return the list to the application. Because any smart card readers that are being redirected over other remote sessions will have been removed from the list, the application will only see a smart card reader that is being redirected to the same remote session in which the application is executing.

In one embodiment, the present invention can be implemented, by a smart card stub that executes on a server in a virtual desktop environment, as a method for isolating a redirected smart card reader to a remote session. The smart card stub, which is executing in a remote session, can receive a response to a function call that was made by an application executing in the remote session to enumerate smart card readers. The smart card stub can access a list of smart card readers included in the response. For each smart card reader identified in the list, the smart card stub can query a filter driver to obtain a session identifier for the smart card reader, and remove the smart card reader from the list if the obtained session identifier is different than a session identifier of the application. The smart card stub can then relay the response to the application after removing any smart card readers with different session identifiers from the list.

In another embodiment, the present invention can be implemented as computer storage media storing computer executable instructions which when executed on a server implement a smart card stub that executes in a remote session and is configured to isolate a redirected smart card reader to the remote session. The smart card stub can receive, from a smart card proxy, responses to smart card API calls that are made by applications executing in the remote session. For each response, the smart card stub can determine whether the response enumerates smart card readers that are available on the server. When it is determined that a response enumerates smart card readers that are available on the server, the smart card stub can modify the response to remove any smart card readers that are not redirected to the remote session in which the smart card stub is executing.

In another embodiment, the present invention can be implemented as a virtual desktop infrastructure configured to be executed on a server and that includes: a smart card stub that is configured to execute in a remote session, and a smart card proxy that is configured to execute in session 0. The smart card stub passes smart card function calls to the smart card proxy and the smart card proxy passes responses to the smart card function calls to the smart card stub. The virtual desktop infrastructure can also include a filter driver that is configured to execute on a smart card driver stack. When the smart card stub receives a response from the smart card proxy that enumerates smart card readers, the smart card stub communicates with the filter driver to identify a session identifier associated with each enumerated smart card. The smart card stub removes from the response any smart card reader associated with a session identifier that is different than a session identifier of an application to which the response is directed.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 7A-7F illustrate an example of the process that smart card stub can perform to implement session isolation for a smart card reader;

DETAILED DESCRIPTION

Figure 1:
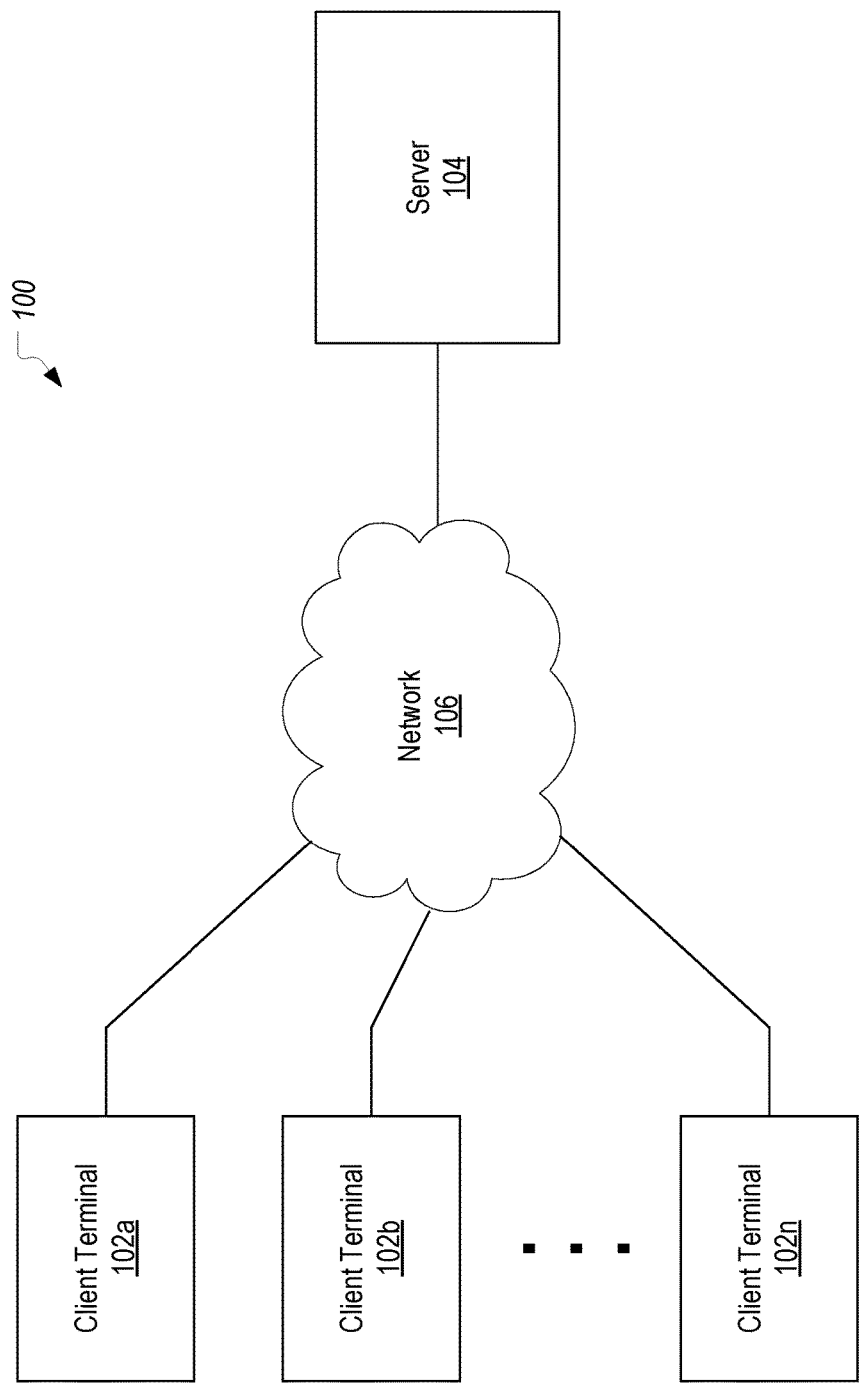
FIG. 1 illustrates an example computing environment in which the present invention can be implemented.
Figure 2:
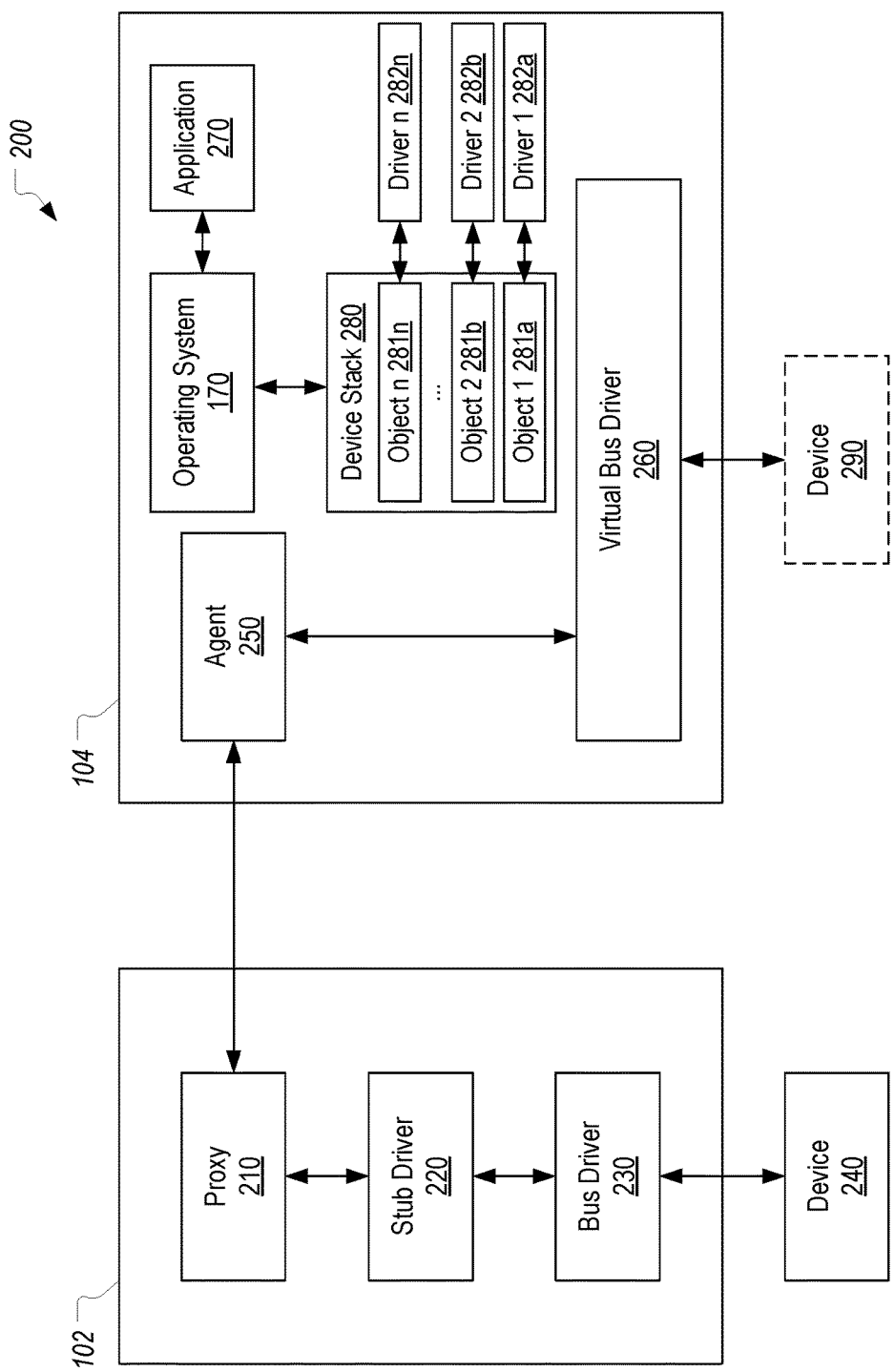
FIG. 2 illustrates how a USB device can be redirected from a client terminal to a server.
Figure 3A:
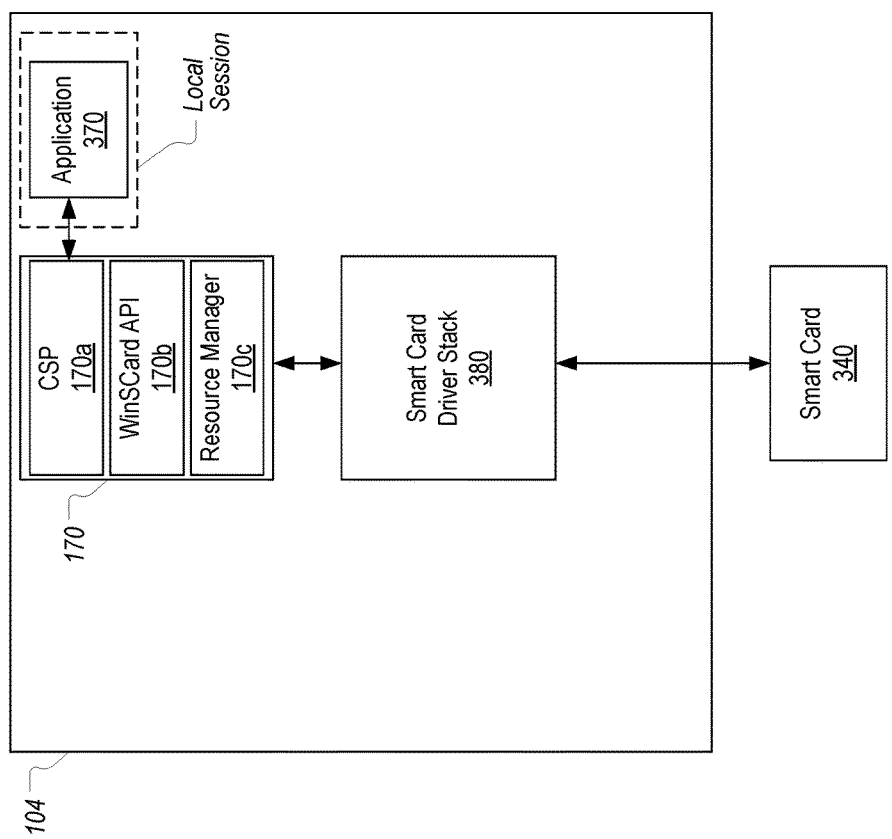
FIG. 3A illustrates how the Windows operating system provides access to a locally connected smart card.
Figure 3B:
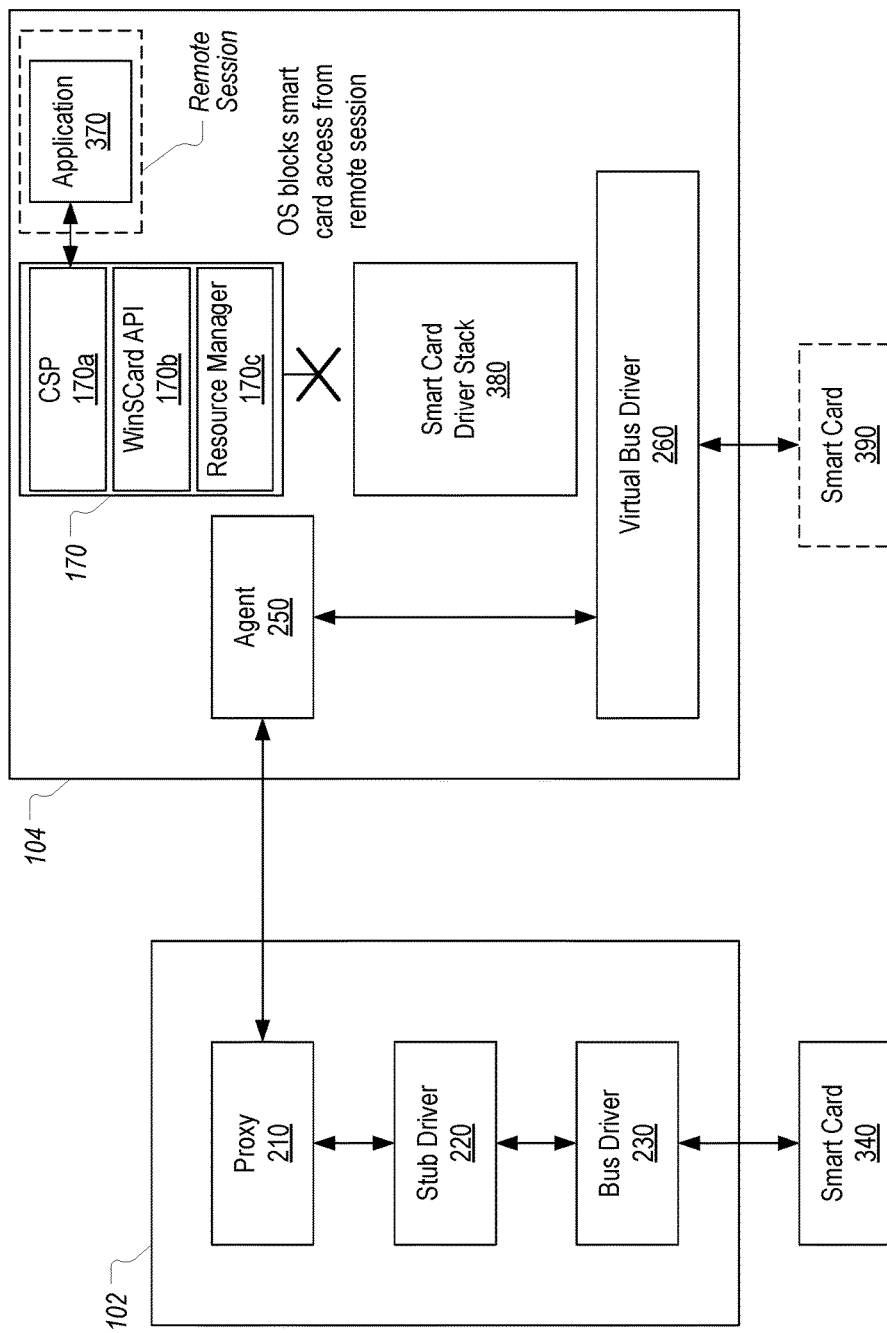
FIG. 3B illustrates how the Windows operating system prevents a smart card from being accessed by an application running in a remote session.
Figure 3C:
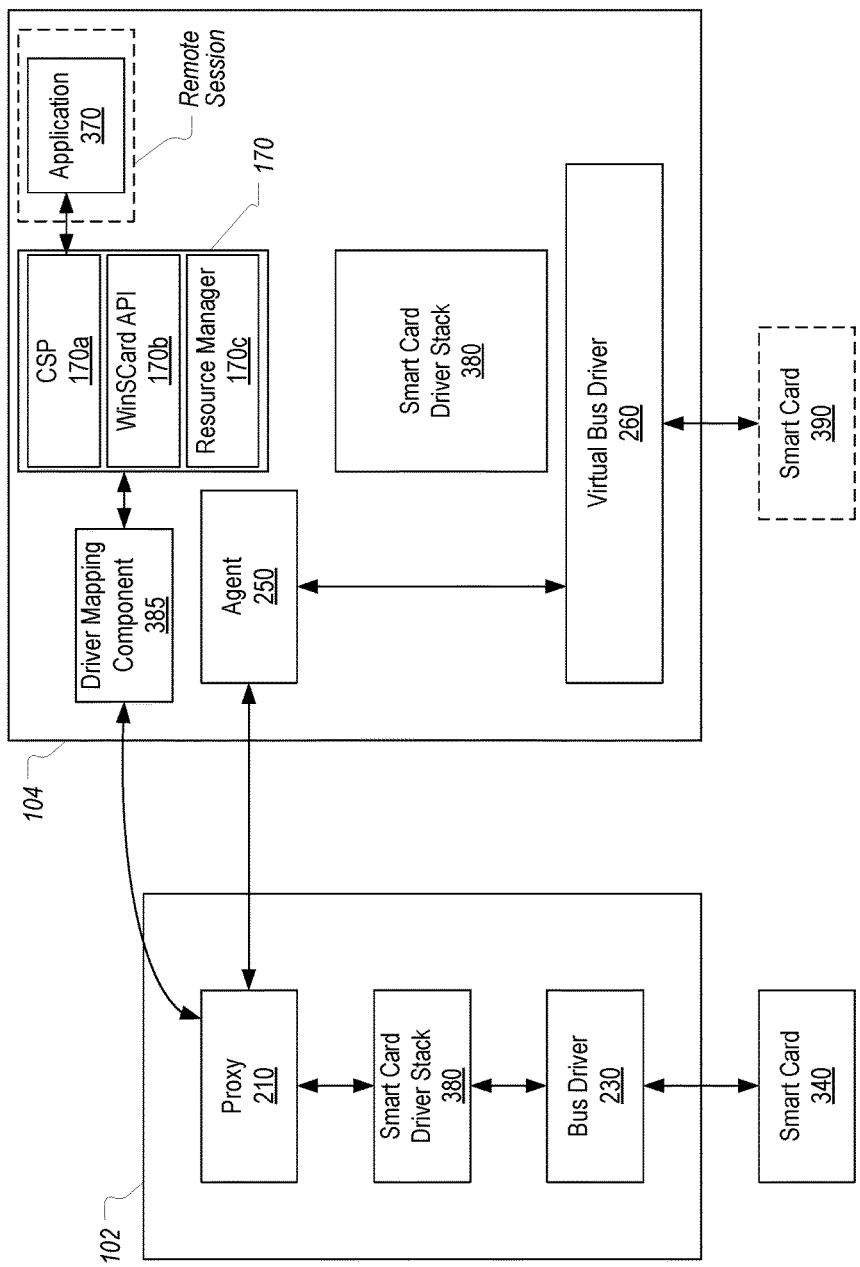
FIG. 3C illustrates how the Windows operating system performs driver mapping to enable a redirected smart card to be accessed from within a remote session.
Figure 4:
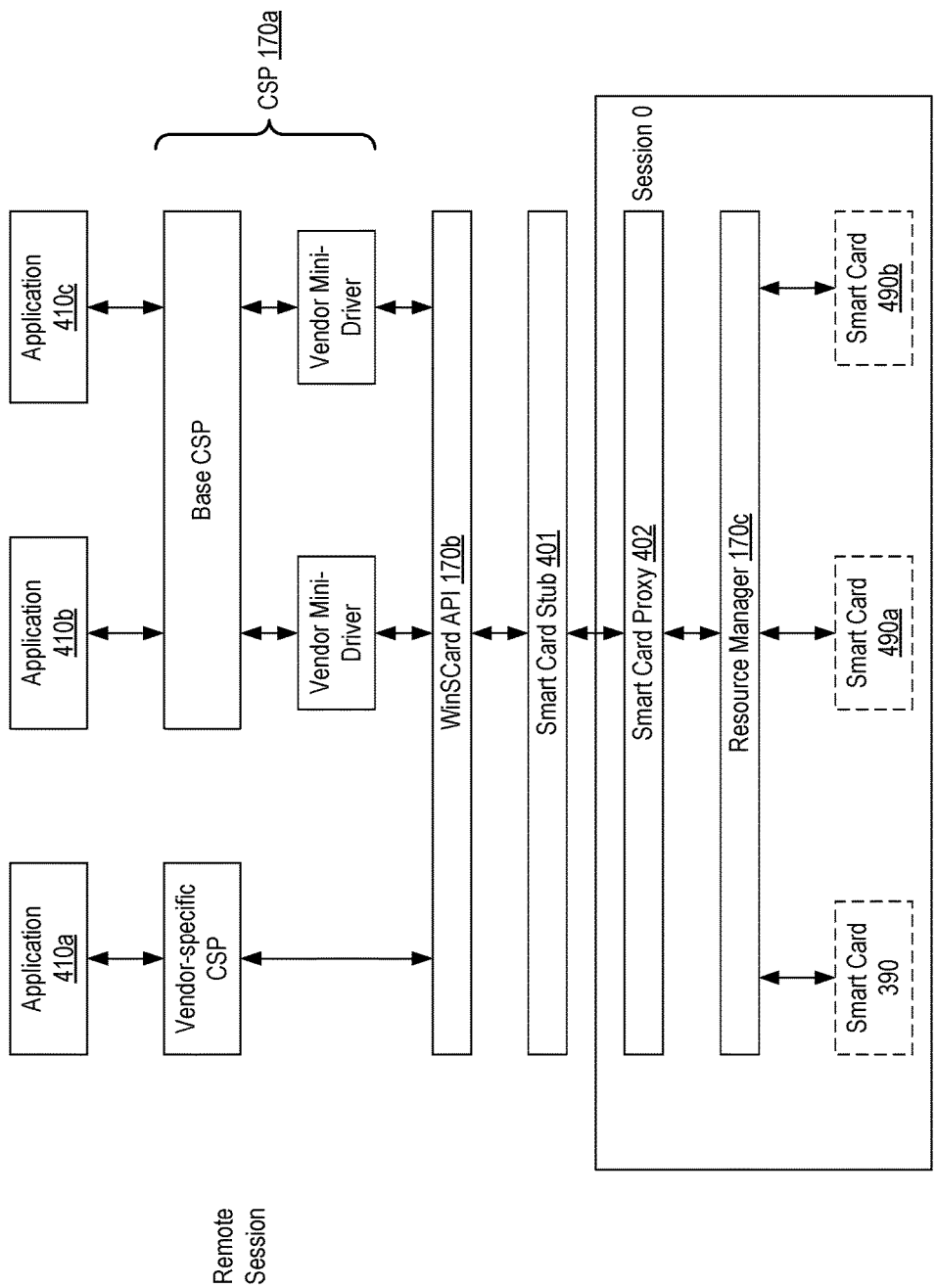
FIG. 4 illustrates the server side architecture that can be employed to implement embodiments of the present invention.

Prior to describing how the present invention can isolate a smart card reader to a remote session, a process for redirecting a smart card reader to a remote session will be described. FIG. 4 illustrates an example of the server-side architecture that can be employed to implement embodiments of the present invention. As shown, this server-side architecture includes each of the components of the Windows Smart Card Subsystem as addressed above, namely, CSP 170a, WinSCard API 170b, and resource manager 170c. A number of applications 410a-410c are shown as employing either the Windows-provided base CSP or a vendor-specific CSP to interface with WinSCard API 170b. As described above, WinSCard API 170b provides the functions for communicating smart card access requests to resource manager 170c which will then pass the requests to the appropriate driver stack for the targeted smart card reader. FIG. 4 represents that various smart card readers are connected to server 104 including smart card readers 390, 490a, and 490b. Smart card readers 490a and 490b could represent smart card readers that are either redirected or directly connected to server 104.

FIG. 4 shows that resource manager 170c is a trusted service that executes in session 0. As described in the background, resource manager 170c is configured to prevent applications 410a-410c from accessing a smart card reader if these applications are executing within a remote session. Therefore, if a user establishes a remote session with server 104 and executes any of applications 410a-410c within the remote session for the purpose of accessing a redirected smart card reader, resource manager 170c will block the access.

To address this issue, the present invention employs a smart card stub 401 and a smart card proxy 402 in order to, in essence, cause resource manager 170c to believe that applications 410a-410c are executing within session 0 rather than within a remote session. Smart card stub 401 comprises an executable component that is configured to intercept smart card API calls. For example, smart card stub 401 could be a DLL that hooks itself to each API call in WinSCard API 170b that can be employed to direct a request to a smart card reader. These API calls can include the SCardConnect function, the SCardBeginTransaction function, the SCardTransmit function, and the SCardGetReaderDeviceInstanceId function to name just a few. Accordingly, whenever any of the hooked functions are called, smart card stub 401 will be invoked to handle the call.

For any API call that it intercepts, smart card stub 401 can redirect the API call to smart card proxy 402. For example, smart card stub 401 and smart card proxy 402 can communicate via remote procedure calls (RPC). In particular, whenever smart card stub 401 intercepts a smart card API call, it can employ an RPC routine to cause smart card proxy 402 to execute the intercepted call. Therefore, from the perspective of resource manager 170c, the call will be viewed as having been made by smart card proxy 402 rather than one of applications 410a-410c. Because smart card proxy 402 executes in session 0, resource manager 170c will not block the call but will instead direct it to the appropriate smart card reader. Once the call returns, smart card proxy 402 will use RPC techniques to return the response to smart card stub 401 and then onto the calling application.

Figure 5:
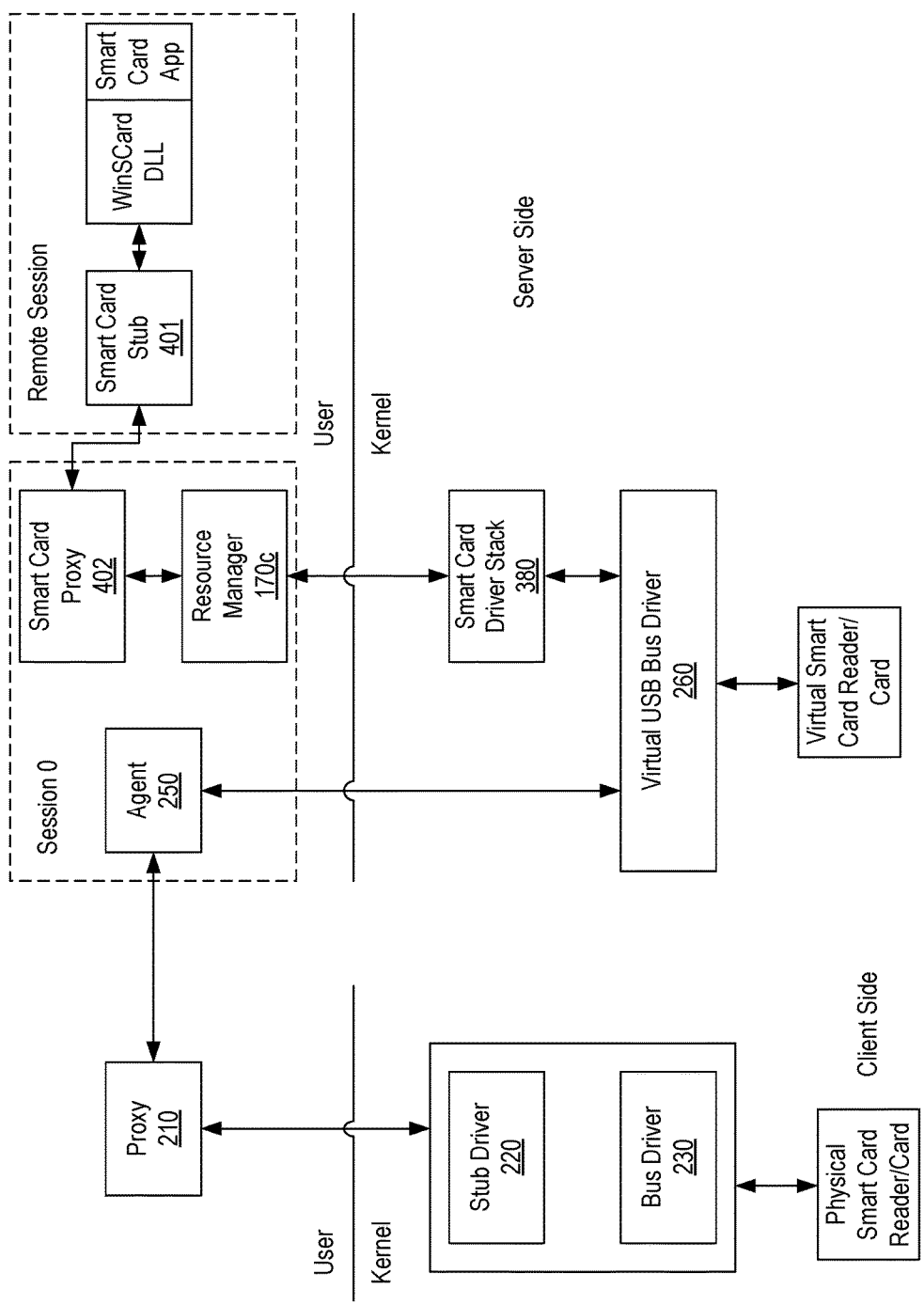
FIG. 5 illustrates the client/server architecture that can be employed to implement embodiments of the present invention.

FIG. 5 represents the client/server architecture that can be employed to enable a redirected smart card reader to be accessed from within a remote session. As was described in the background, when a smart card reader is connected to a client that has established a remote session with a server, the virtual desktop infrastructure can redirect the smart card reader to the server to cause the smart card reader to appear as if it were physically connected to the server. In this scenario, the server will create a remote (or user) session in which any applications accessed by the client will be executed.

FIG. 5 illustrates that a smart card application has been invoked by the client and is therefore running in a remote session. The smart card application is configured to use a CSP and the WinSCard DLL for purposes of making smart card API calls. In accordance with the techniques of the present invention, smart card stub 401 can also be loaded in the remote session in a manner that allows it to intercept the smart card application's smart card API calls.

When smart card stub 401 intercepts a smart card API call, it will use RPC to pass the API call to smart card proxy 402 which is executing in session 0. Smart card proxy 402 will then invoke the API call causing resource manager 170c to believe that the call has originated within session 0. Resource manager 170c will perform its processing to cause the proper communications to be delivered to smart card driver stack 380 (e.g., causing suitable IRPs/URBs to be routed down to smart card driver stack 380). After passing through smart card driver stack 380, virtual USB bus driver 260 will receive the communications and can route them to proxy 210 via agent 250. Proxy 210 can then deliver the communications to the smart card reader and/or smart card connected to the client. Any response generated by the smart card reader and/or smart card will then be routed back in a reverse manner.

In this way, any application that is executed in a remote session will be able to access a smart card reader/smart card including when a smart card reader is redirected from the client that established the remote session. A user will therefore be able to change a password or certificate of a smart card (or perform any other provided function) from a remote session without needing to employ driver mapping techniques.

The technique of employing a stub in the remote session and a proxy in session 0 enables this access without requiring any specific drivers to be loaded on the client. For example, as shown in FIG. 5, smart card driver stack 380 does not need to be loaded on the client to enable access to the redirected smart card reader from within the remote session. Accordingly, a thin client can remain lightweight even while allowing access to a redirected smart card reader. Also, because the Windows drivers do not need to be loaded on the client, the present invention can be implemented regardless of the client's operating system.

This technique also provides the advantage of being agnostic to the remoting protocol used to establish the remote session. For example, proxy 210 and agent 250 could employ RDP, ICA or any other remoting protocol to communicate without needing to alter the technique for the particular remoting protocol. The technique is also transparent to the calling applications. In particular, because smart card stub 401 intercepts calls to the standard WinSCard functions, applications can call those functions (including the latest non-mapped functions) without knowledge of the underlying technique.

In this architecture, all smart card requests will be viewed as originating in session 0. As a result, prior art techniques for using a kernel filter driver on top of smart card driver stack 380 to perform session isolation will not work. In particular, in these prior art isolation techniques, the kernel filter driver uses the session identifier of the requesting application to determine whether a particular redirected resource should be accessible within a particular session. In these prior art isolation techniques, the kernel filter driver may also move a symbolic link to a redirected resource from the global namespace to a session namespace so that the resource would only be visible within the corresponding session. If these techniques were employed in conjunction with the smart card stub/proxy, the kernel filter driver could not perform these isolation techniques since smart card proxy 402 will be viewed by the kernel filter driver as the requesting application. In other words, from the perspective of the kernel filter driver, any smart card access request will appear as if it originated in session 0 and therefore the kernel filter driver would not allow access to any smart card reader that is being redirected to a remote session.

To address these issues that exist with prior art isolation techniques, and in accordance with embodiments of the present invention, a kernel filter driver can be configured to interface with smart card stub 401 to thereby allow smart card stub 401 to implement session isolation techniques.

Figure 6:
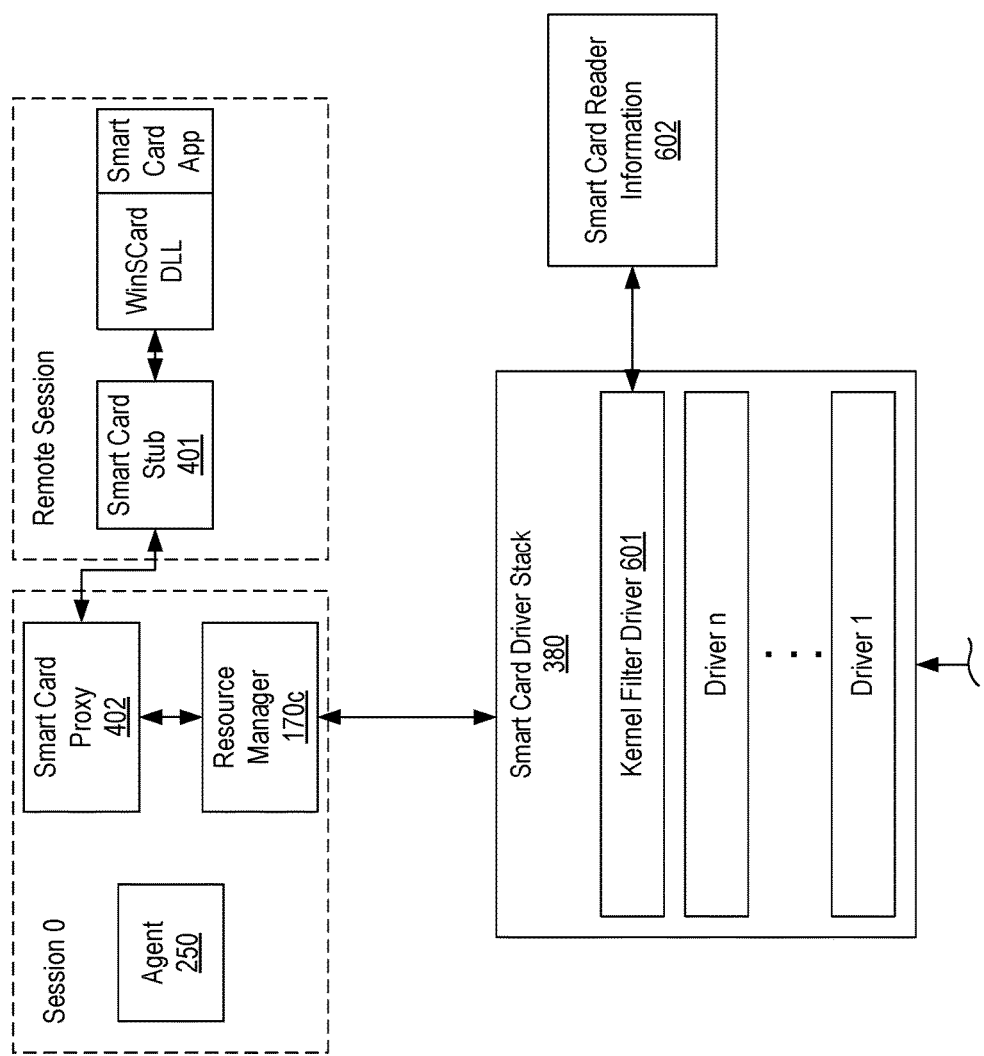
FIG. 6 illustrates that the smart card driver stack can include a kernel filter driver that the smart card stub communicates with to implement session isolation.

FIG. 6 illustrates how a kernel filter driver 601 is employed within the architecture depicted in FIG. 5. As was generally described in the background, a kernel filter driver can sit atop the driver stack for a redirected device to control access to the redirected device. In the present context, kernel filter driver 601 sits atop smart card driver stack 308 which may include a number of other drivers (e.g., driver 1-driver n). With this architecture, kernel filter driver 601 will see the communications that are exchanged when smart card readers are redirected to a remote session.

To enable smart card stub 401 to implement session isolation, kernel filter driver 601 can be configured to maintain information 602 about any smart card reader that is redirected to a remote session on server 104. Information 602 can include various identifiers that are assigned when a smart card reader is redirected to server 104 such as the device instance ID which is a string assigned by the Plug and Play manager that uniquely identifies the device on server 104 and the device session ID (DEVPKEY_Device_SessionId) which is a property that identifies the session(s) that a device instance can be accessed in. Information 602 can also include one or more identifiers that are based on attributes of the smart card reader such as a device name formed using the vendor name, vendor interface type, and device unit of the smart card reader. Kernel filter driver 601 can obtain and store smart card reader identifiers in information 602 in any suitable manner including, for example, as part of the plug and play process that is performed when a smart card reader is redirected to server 104. Also, kernel filter driver 601 can remove identifiers from information 602 pertaining to a redirected smart card reader in response to the smart card reader being disconnected from server 104. Accordingly, at any given time, information 602 can include a number of identifiers for each smart card reader that is currently being redirected to server 104.

FIGS. 7A-7F provide an example of how smart card stub 401 and kernel filter driver 601 can interface to implement session isolation for a redirected smart card reader. In these figures, it will be assumed that N smart card readers are currently being redirected to server 104. N can be any integer including 0. However, for the sake of illustration, it will be assumed that N is at least 4. Accordingly, information 602 is shown as storing identifiers for each of these redirected smart card readers. For simplicity, FIGS. 7A-7F generalize these identifiers. However, FIGS. 8A and 8B will provide more detailed examples of these identifiers and how they can be employed to identify which session each smart card reader is being redirected to. Also, in these figures, the inventive process will be shown as being implemented between kernel filter driver 601 and an instance of smart card stub 401 that is executing in session 10 which is assumed to be a remote session. It is to be understood that this same process could be performed by an instance of smart card stub 401 executing in any remote session.

Turning now to FIG. 7A, the process can commence with an application 700 making a call to the SCardListReaders API to enumerate available smart card readers. For example, application 700 could make this call as part of an authentication process. In the manner described above, smart card stub 401 can intercept this call and redirect it to smart card proxy 402 so that the call will not be blocked by resource manager 170c.

Figure 7B:
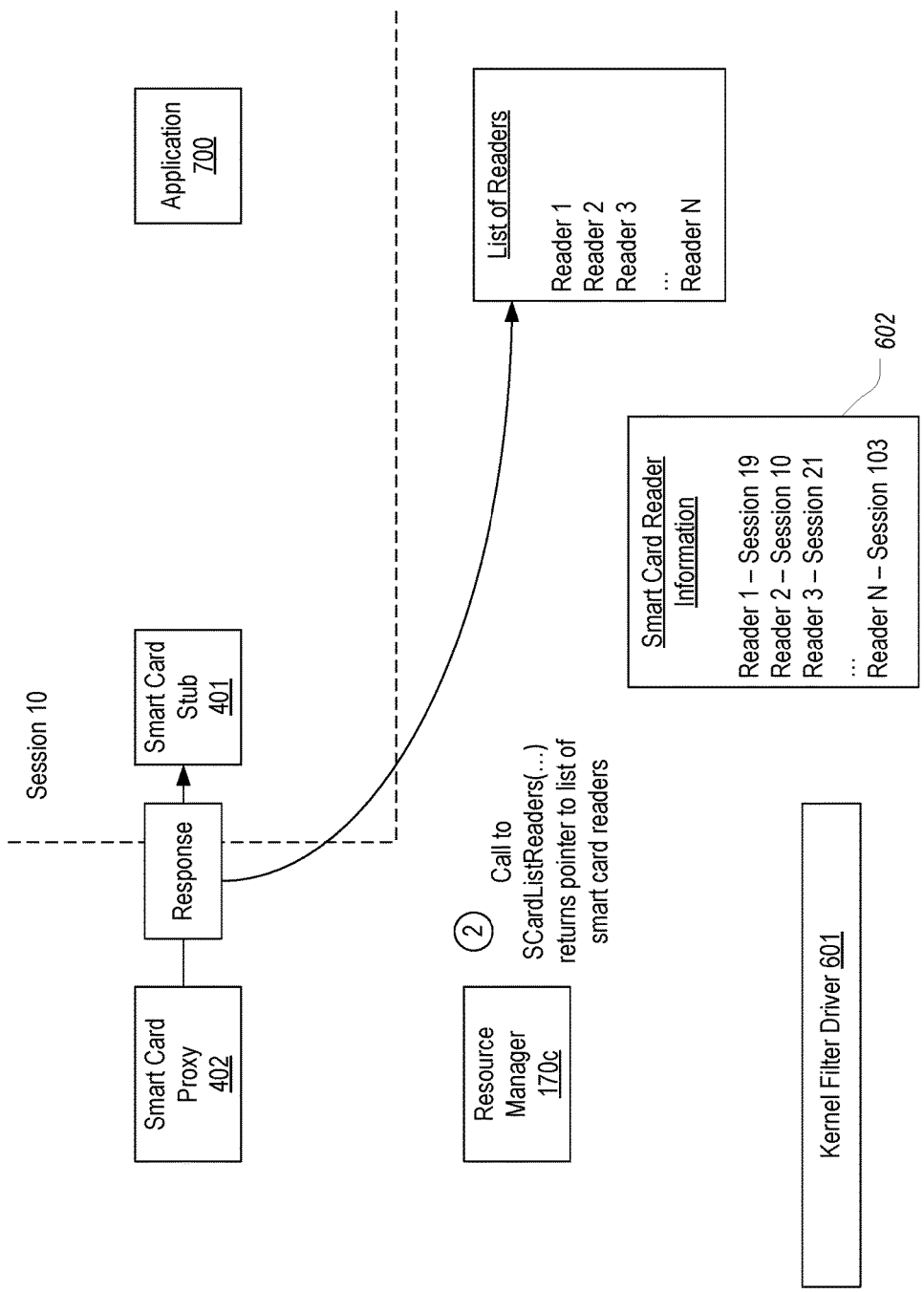
Figure 7C:
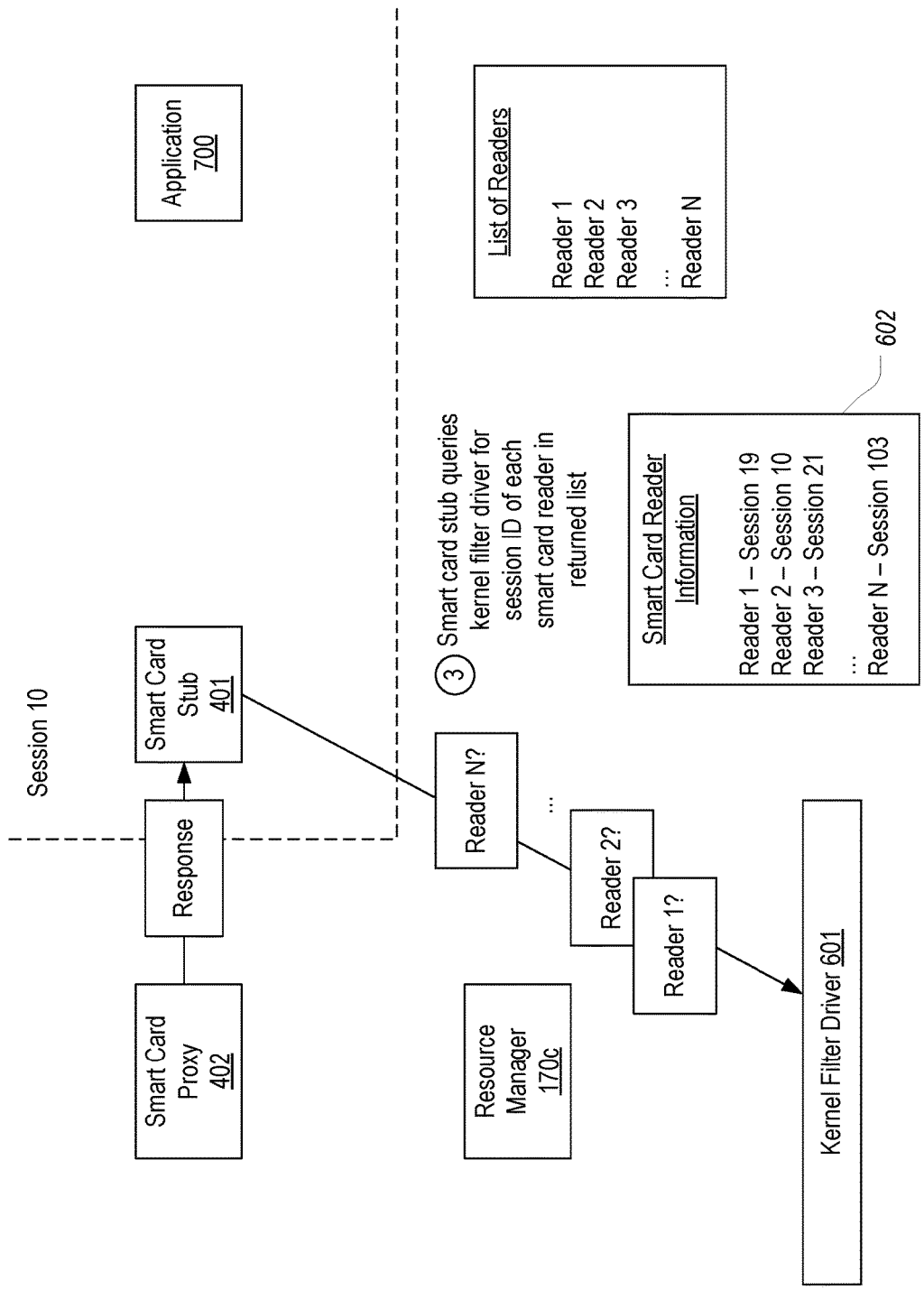

In step 2, as represented in FIG. 7B, a response to the call to the SCardListReaders API will be returned to smart card proxy 402 which will then pass the response onto smart card stub 401. As is known, a call to the SCardListReaders API will return a pointer to a list of all available readers (or at least to the available readers of a specified group). For reasons that will be explained in more detail below, this list should include all smart card readers that are connected to server 104 including smart card readers that are being redirected to other remote sessions. If smart card stub 401 were to pass this response to application 700, application 700 would be enabled to access any of the readers included in the list thus creating security issues.

To prevent this from happening and to ensure that application 700 will only be able to see a smart card reader that is being redirected to session 10, smart card stub 401 can perform a number of steps to remove from the list any smart card readers that are not in the same session as application 700. In particular, in FIG. 7C, step 3 depicts that smart card stub 401 can access the list to identify any smart card reader included in the list and then query kernel filter driver 601 for the session identifier of each smart card reader in the list.

Figure 7D:
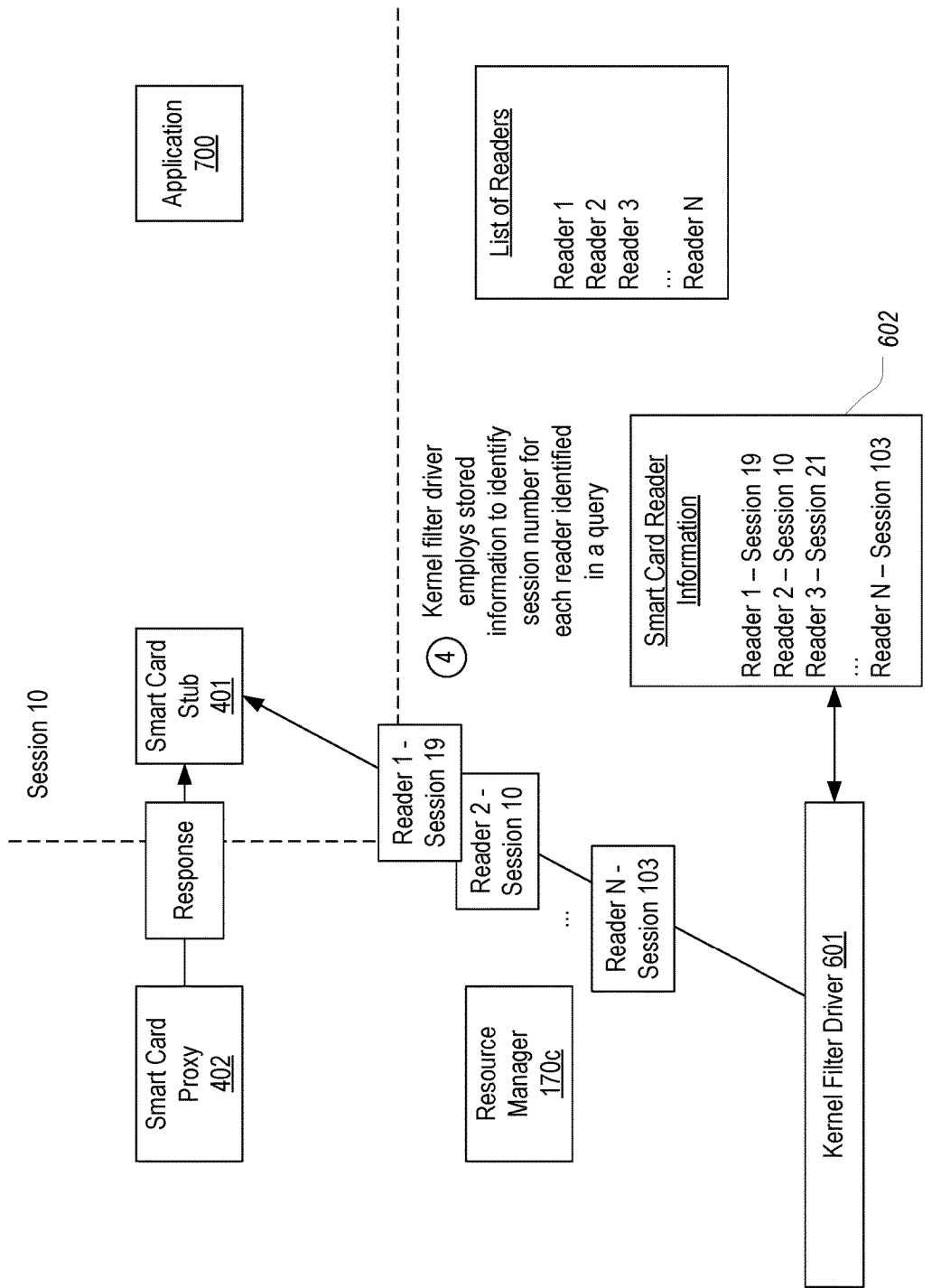

In response to these queries, and as represented as step 4 in FIG. 7D, kernel filter driver 601 can access information 602 to determine the session identifier for each smart card reader identified in a query from smart card stub 401. For example, FIG. 7D shows that kernel filter driver 601 responds to smart card stub 401's queries by identifying that smart card readers 1, 2, . . . and N have a session identifier of 19, 10, . . . and 103 respectively.

Figure 7E:
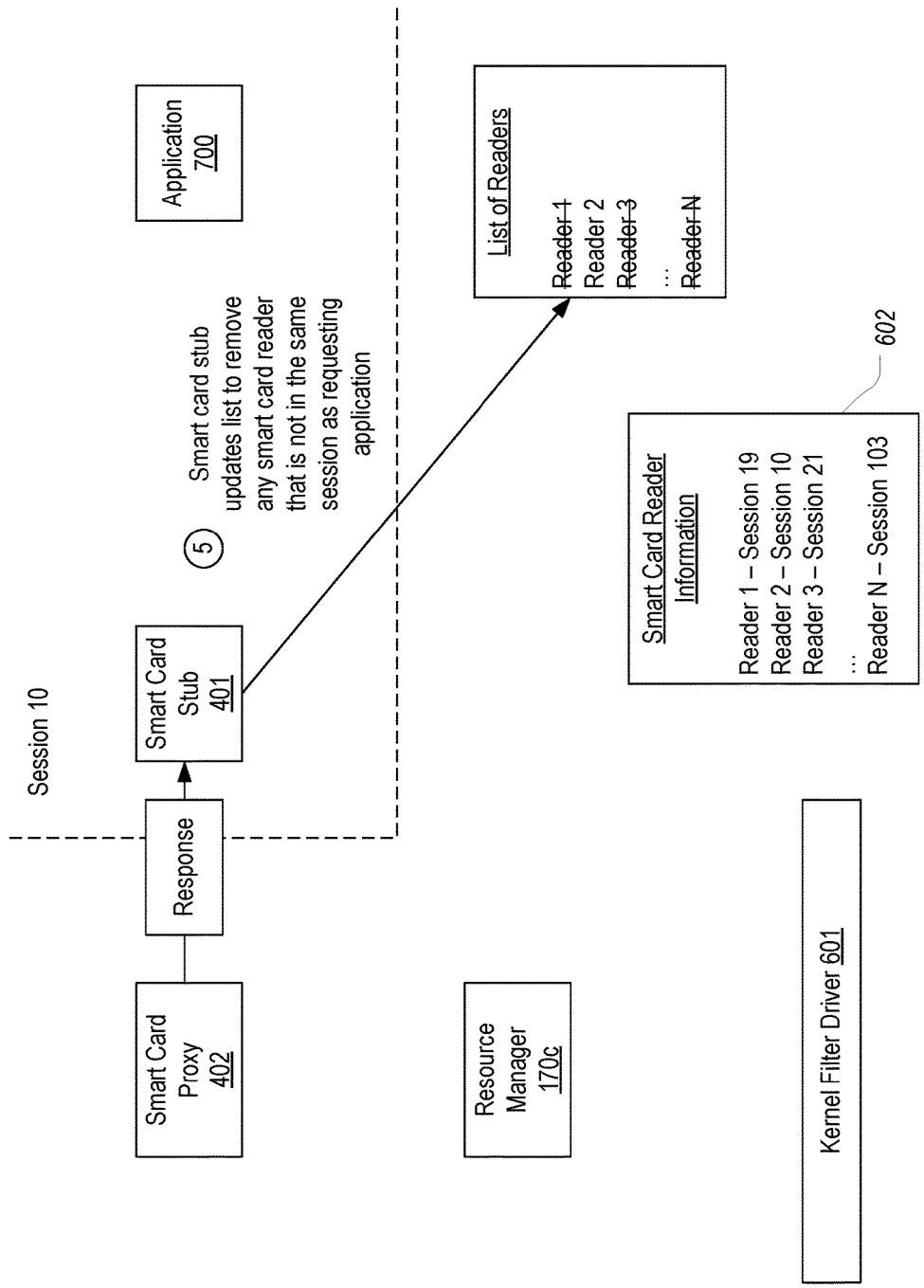

Next, as shown as step 5 in FIG. 7E, smart card stub 401 can update the list to remove any smart card readers that are not in session 10 (i.e., that are not in the same session as the application that called SCardListReaders). For example, smart card stub 401 can determine which session it is executing in using any known technique and can then identify which, if any, of the smart card readers in the list are in the same session. In this example, because only smart card reader 2 is in session 10, smart card stub 401 will remove smart card readers 1 and 3 through N leaving only smart card reader 2 in the list.

Finally, as shown as step 6 in FIG. 7F, smart card stub 401 can pass the response to the call to SCardListReaders onto application 700 only after having removed non-matching smart card readers from the list. As a result, when application 700 receives the list, only smart card reader 2 will be included. In this way, smart card stub 401 can ensure that a redirected smart card will only be accessible within the remote session to which it is redirected thereby isolating the redirected smart card reader from applications in any other remote sessions.

Figure 8A:
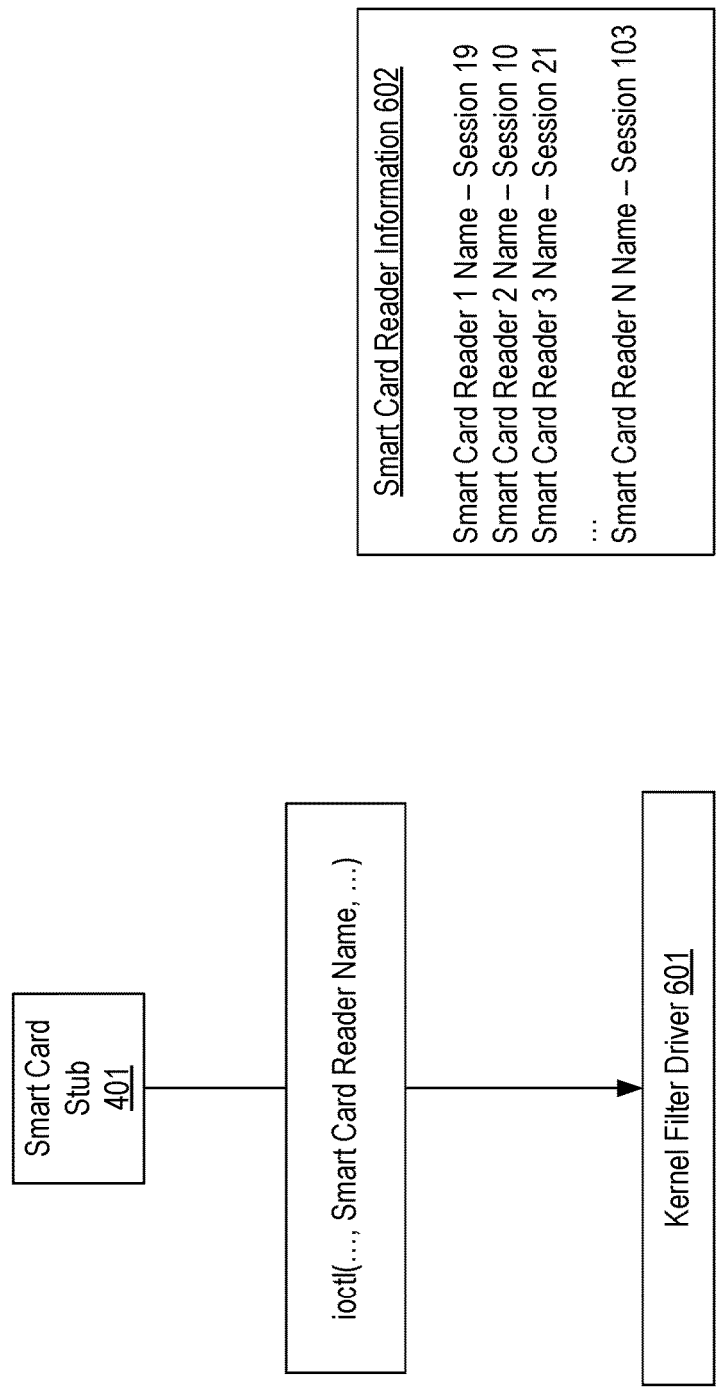
FIGS. 8A and 8B provide examples of how the smart card stub can communicate with the filter driver to obtain a session identifier of a particular smart card reader.
Figure 8B:
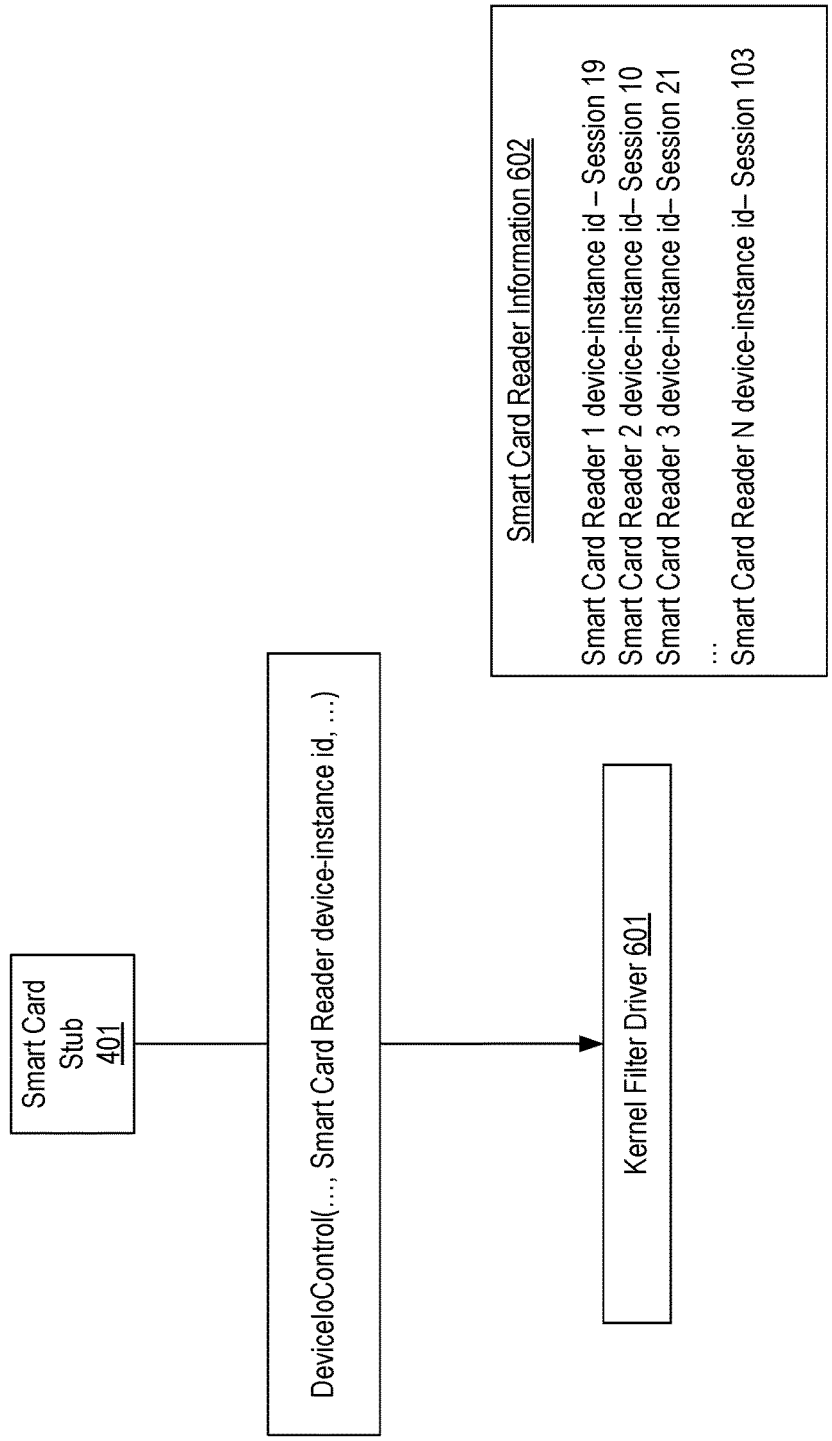

FIGS. 8A and 8B each provide a more specific example of how smart card stub 401 can communicate with kernel filter driver 601 to obtain the session identifier for a particular smart card reader that is included in the list returned by a call to SCardListReaders. FIG. 8A represents an approach that is operating system independent whereas FIG. 8B represents an approach that can be employed on Windows implementations. In either case, this communication can be performed using input/output control (ioctl) system calls.

In FIG. 8A, smart card stub 401 is shown as employing the ioctl( ) function to pass a smart card reader device name to kernel filter driver 601. The ioctl( ) function can specify a control code indicating that smart card stub 401 is requesting the session identifier for the identified smart card reader (i.e., for the smart card reader whose name is included as input to the ioctl( ) function). As mentioned above, this device name can be formed of various attributes of the smart card reader such as vendor name, vendor interface type, and the device unit in the form <vendor name><vendor interface type><device unit> (e.g., "Contoso Smart Card Reader 0").

The device name is employed by resource manager 170c to describe a smart card reader and therefore the list returned by SCardListReaders identifies smart card readers with this device name. In such cases, information 602 can store a mapping between the device name and session identifier for each smart card reader being redirected to server 104. In non-Windows systems where the returned list may not identify each smart card reader by its device name, smart card stub 401 could employ whatever identifier is included in the list to query the system to obtain the attributes of the device name and then construct the device name for submission to kernel filter driver 601.

In FIG. 8B, smart card stub 401 is shown as employing the DeviceIoControl( ) function to pass the smart card reader's device instance ID to kernel filter driver 601. As mentioned above, the device instance ID is a system-supplied identification string in Windows. Smart card stub 401 can obtain the device instance ID for a particular smart card reader by calling the ScardGetReaderDeviceInstanceId with the smart card reader's device name (which would be retrieved from the list) as input. In such embodiments, information 602 can store a mapping between the device instance ID and the session identifier for each redirected smart card reader.

Figure 9:
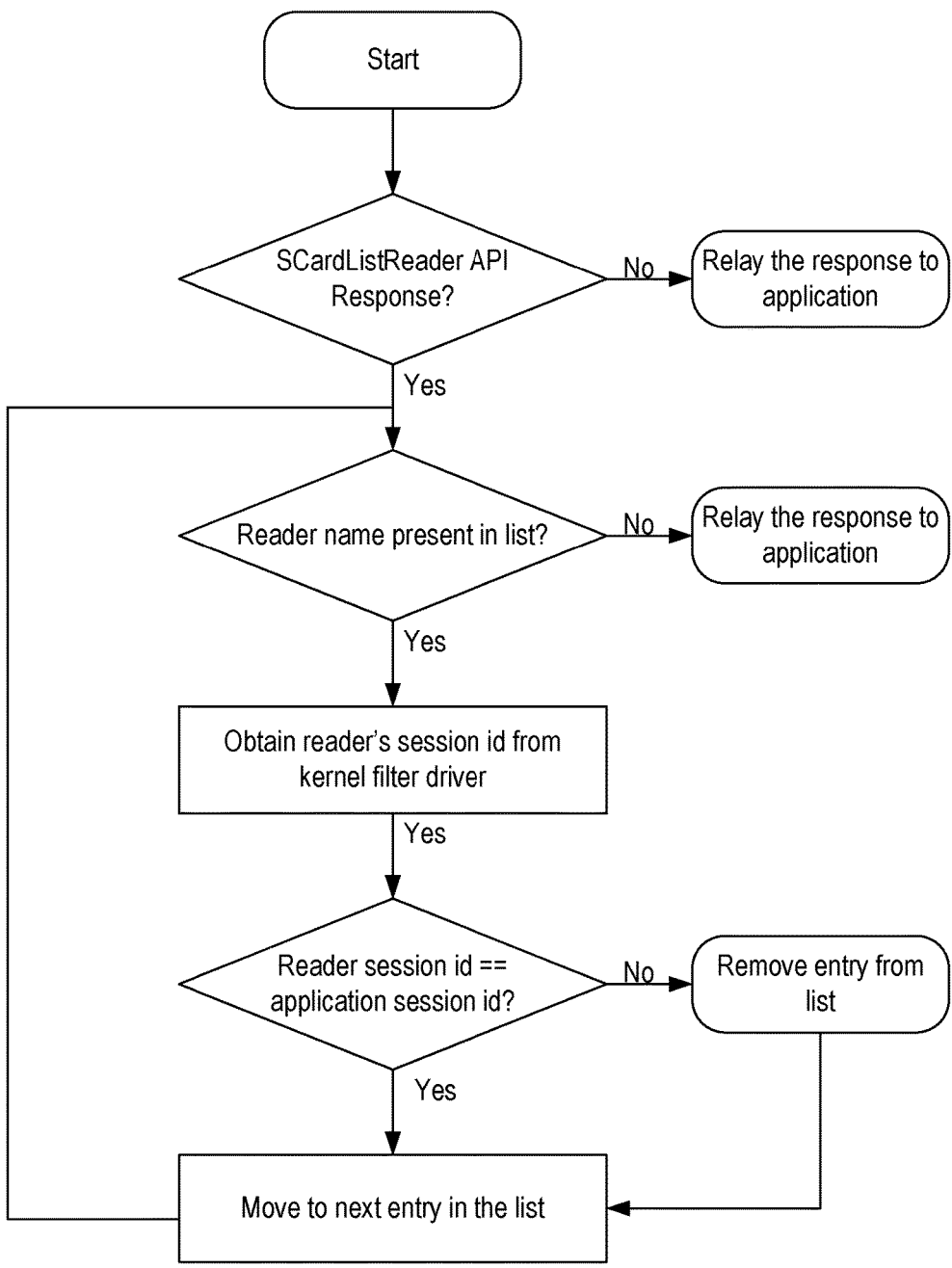
FIG. 9 provides a flowchart of the session isolation process performed by the smart card stub.

FIG. 9 provides a flowchart to summarize the session isolation processing that is performed by smart card stub 401 when it receives a response from smart card proxy 402. As shown, when smart card stub 401 receives a response from smart card proxy 402, it can first determine whether the response is a SCardListReader API response. If not, smart card stub 401 can relay the response to the requesting application. If so, smart card stub 401 can determine if a smart card reader name is present in the list that is populated by the call to SCardListReader. If no smart card reader name is present in the list (i.e., the returned list is empty), the smart card stub 401 can relay the response to the requesting application. In contrast, if a smart card reader name is included in the list, smart card stub 401 can employ the name to obtain the corresponding session identifier from kernel filter driver 601. As described above, the session identifier can be obtained in various fashions such as by providing the smart card reader name directly to kernel filter driver 601 or by first employing the smart card reader name to obtain the device instance ID and then employing the device instance ID to obtain the corresponding session identifier from kernel filter driver 601. Of course, other techniques could be employed based on how kernel filter driver 601 maps a session identifier to an identifier of a smart card reader.

Once smart card stub 401 obtains the session identifier, it can then compare the received session identifier to the session identifier of the requesting application. If these session identifiers do not match, smart card stub 401 can remove the smart card reader name from the list. However, if they do match, smart card stub 401 will leave the smart card reader name in the list. This process can be repeated until each smart card reader name in the list has been verified and then the response will be returned to the requesting application.

To summarize, the present invention allows a smart card reader that is redirected to a remote session to be accessible within and isolated to the remote session. This session isolation can be implemented independently of the remoting protocol that is employed to establish the remote session and independently of the client's operating system.

Figure 10:
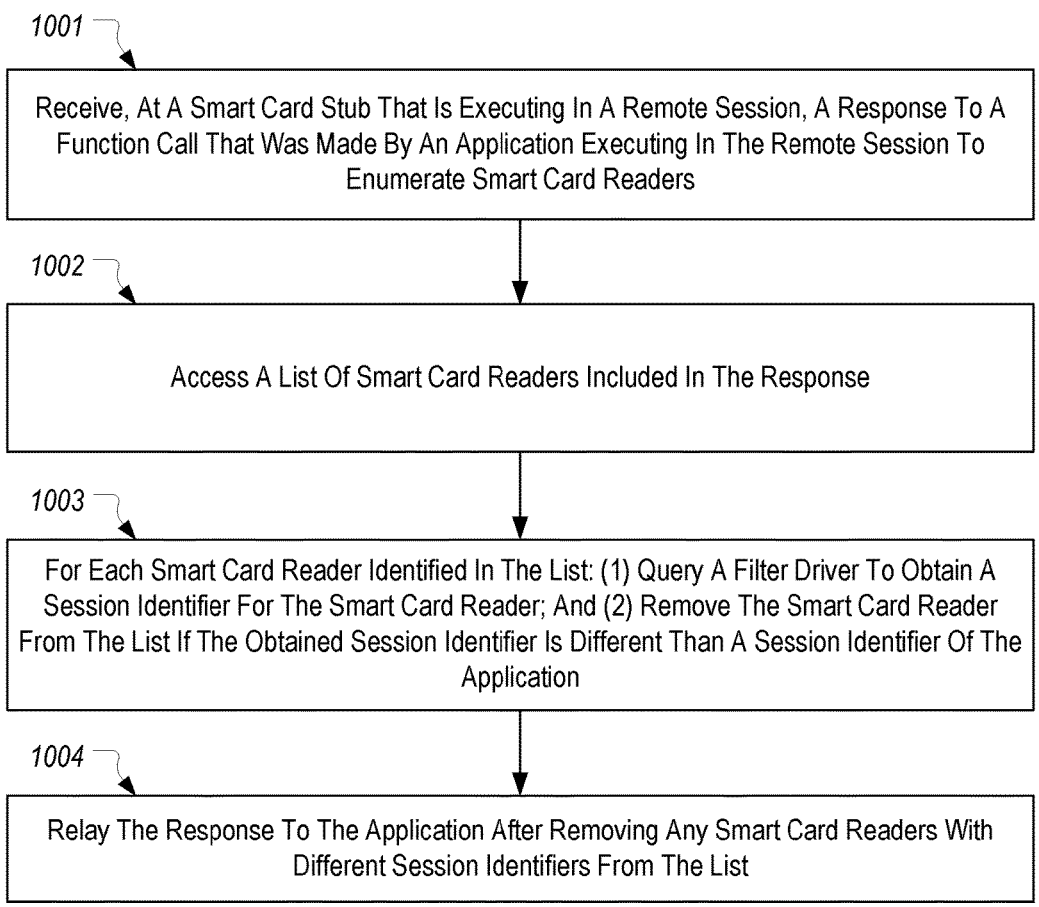
FIG. 10 is a flowchart of an example method for isolating a redirected smart card reader to a remote session.

FIG. 10 provides a flowchart of an example method 1000 for isolating a redirected smart card reader to a remote session. Method 1000 can be implemented by smart card stub 401.

Method 1000 includes an act 1001 of receiving, at a smart card stub that is executing in a remote session, a response to a function call that was made by an application executing in the remote session to enumerate smart card readers. For example, smart card stub 401 can receive a response to a call to the SCardListReaders API.

Method 1000 includes an act 1002 of accessing a list of smart card readers included in the response. For example, smart card stub 401 can access the list of smart card readers that is created when the SCardListReaders function is called.

Method 1000 includes an act 1003 of, for each smart card reader identified in the list: (1) querying a filter driver to obtain a session identifier for the smart card reader; and (2) removing the smart card reader from the list if the obtained session identifier is different than a session identifier of the application. For example, smart card stub 401 can query kernel filter driver 601 for session identifiers of the smart card readers identified in a response to the SCardListReaders function and remove any smart card readers that have a session identifier differing from the session identifier of application 700.

Method 1000 includes an act 1004 of relaying the response to the application after removing any smart card readers with different session identifiers from the list. For example smart card stub 401 can relay the response to the SCardListReaders function to application 700 after removing any smart card reader with a non-matching session identifier.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented on a server in a virtual desktop infrastructure environment, for isolating a redirected smart card reader to a remote session, the method comprising:
   receiving, at a smart card stub that is executing in a remote session, a response to a function call that was made by an application executing in the remote session to enumerate smart card readers;
   accessing a list of smart card readers included in the response;
   for each smart card reader identified in the list:
      (1) querying a filter driver to obtain a session identifier for the smart card reader; and
      (2) removing the smart card reader from the list if the obtained session identifier is different than a session identifier of the application; and
   relaying the response to the application after removing any smart card readers with different session identifiers from the list.

2. The method of claim 1, wherein the function call is the SCardListReaders function call.

3. The method of claim 1, wherein querying the filter driver comprises sending a device name of the smart card reader to the filter driver.

4. The method of claim 3, wherein the device name comprises a vendor name, an interface type, and a device unit.

5. The method of claim 1, wherein querying the filter driver comprises sending a device instance ID of the smart card reader to the filter driver.

6. The method of claim 5, wherein the smart card stub uses a device name of the smart card reader to obtain the device instance identification (ID).

7. The method of claim 1, wherein the filter driver stores mappings between each smart card reader that is being redirected to the server and a session identifier of the remote session to which the smart card reader is being redirected.

8. The method of claim 1, wherein querying the filter driver comprises sending an input/output control (ioctl) communication.

9. The method of claim 1, wherein the smart card stub receives the response to the function call from a smart card proxy that is executing in session 0.

10. The method of claim 1, wherein the list included in the response that is relayed to the application identifies a first smart card reader, the method further comprising:
   intercepting, at the smart card stub, a first request from the application to access the first smart card reader; and
   passing the first request to a smart card proxy that is executing in session 0 to cause the smart card proxy to invoke the first request.

11. The method of claim 10, further comprising:
   receiving, at the smart card stub and from the smart card proxy, a first response to the first request; and
   passing the first response to the application.

12. The method of claim 1, further comprising:
   receiving, at the smart card stub, a second response to a function call that was made by an application executing in the remote session to enumerate smart card readers;
   accessing a list of smart card readers included in the second response;
   determining that the list does not identify any smart card readers; and
   relaying the second response to the application without modifying the list.

13. The method of claim 1, wherein the list identifies one or more smart card readers that are associated with a session identifier that is different than the session identifier of the application such that the smart card stub removes the one or more smart card readers from the list prior to relaying the response to the application.

14. One or more computer storage media storing computer executable instructions which when executed on a server implement a smart card stub that executes in a remote session and is configured to isolate a redirected smart card reader to the remote session by performing the following:
   receiving, from a smart card proxy, responses to smart card API calls that are made by applications executing in the remote session;
   for each response, determining whether the response enumerates smart card readers that are available on the server; and
   when it is determined that a response enumerates smart card readers that are available on the server, modifying the response to remove any smart card readers that are not redirected to the remote session in which the smart card stub is executing.

15. The computer storage media of claim 14, wherein modifying the response comprises querying a filter driver to obtain a session identifier for each smart card reader.

16. The computer storage media of claim 15, wherein querying the filter driver comprises sending a device name for each smart card reader.

17. The computer storage media of claim 15, wherein querying the filter driver comprises sending a device instance identification (ID) for each smart card reader.

18. The compute storage media of claim 14, wherein the smart card stub receives the responses from the smart card proxy via Remote Procedure Call (RPC).

19. One or more computer storage media storing computer executable instructions which when executed implement components of a virtual desktop infrastructure configured to be executed on a server, the components comprising:
   a smart card stub that is configured to execute in a remote session;
   a smart card proxy that is configured to execute in session 0, wherein the smart card stub passes smart card function calls to the smart card proxy and the smart card proxy passes responses to the smart card function calls to the smart card stub; and
   a filter driver that is configured to execute on a smart card driver stack;

wherein, when the smart card stub receives a response from the smart card proxy that enumerates smart card readers, the smart card stub communicates with the filter driver to identify a session identifier associated with each enumerated smart card, and wherein the smart card stub removes from the response any smart card reader associated with a session identifier that is different than a session identifier of an application to which the response is directed.

20. The computer storage media of claim 19, wherein the filter driver maintains a mapping between each smart card reader that is redirected to the server and a session identifier of the smart card reader.

\* \* \* \* \*